United States Patent [19]

Crooks

[11] 4,266,645

[45] May 12, 1981

[54] FLUID SHEAR COUPLING

[75] Inventor: James W. Crooks, Carmel, Ind.

[73] Assignee: Wallace-Murray Corporation, Indianapolis, Ind.

[21] Appl. No.: 910,293

[22] Filed: May 30, 1978

[51] Int. Cl.[3] ........................ F16D 43/25; F16D 35/00

[52] U.S. Cl. ................................ 192/58 B; 192/82 T

[58] Field of Search ............................ 192/58 B, 82 T

[56] References Cited

U.S. PATENT DOCUMENTS

| | | | |
|---|---|---|---|
| 3,059,745 | 10/1962 | Tauschek | 192/58 B |
| 3,088,566 | 5/1963 | Fleming | 192/58 B |
| 3,170,552 | 2/1965 | Mitchell | 192/58 B |
| 3,194,372 | 7/1965 | Weir | 192/58 B |
| 3,323,623 | 6/1967 | Roper | 192/58 B |
| 3,559,785 | 2/1971 | Weir | 192/58 B |
| 3,559,785 | 2/1971 | Weir | 192/58 B |
| 3,727,735 | 4/1973 | LaFlame | 192/58 B |
| 3,910,391 | 10/1975 | Detty et al. | 192/58 B |
| 3,983,980 | 10/1976 | Weintz | 192/58 B |
| 4,050,559 | 9/1977 | Andrews et al. | 192/58 B |

*Primary Examiner*—Allan D. Herrmann

[57] ABSTRACT

A fluid shear coupling is disclosed herein which comprises a coupling disc received within a housing. The coupling disc and housing are mounted for coaxial rotation, and the coupling disc is connectable to a drive pulley assembly for driving the coupling disc in rotation. The coupling disc includes a pair of annular flanges extending axially in opposite directions from the periphery of the disc. The flanges define inside and outside working surfaces with the inside and outside working surfaces including helical grooves for moving a fluid received against those surfaces in a predetermined direction. The housing includes working portions closely conforming to the working surfaces of the flanges. A fluid reservoir is defined by the housing and is operable to move a working fluid into the space between the flanges and the working portions of the housing to provide variable coupling of the housing with the coupling disc.

24 Claims, 7 Drawing Figures

FLUID SHEAR COUPLING

BACKGROUND OF THE INVENTION

1. Field of the Invention

The present invention relates generally to fluid shear couplings in which the coupling of a drive member and a driven member is variable, and more particularly to a fluid shear coupling responsive to preselected parameters.

2. Description of the Prior Art

Fluid shear couplings have been used in the prior art for a great variety of mechanical applications. The shear properties of a contained, viscous fluid are utilized to provide a varying degree of coupling between a drive member and a driven member, which members are typically mounted for coaxial rotation. A primary field of application for such fluid shear couplings is in the area of automobile engine cooling systems. Internal combustion engines generally utilized in automobiles are required to be cooled to maintain the engine below a certain maximum temperature. The engine cooling is typically obtained by pumping a fluid through passageways in the engine block with the fluid being transported to a radiator which provides heat dissipation by radiation and convection.

The cooling requirements for an automobile engine vary based upon several factors, including the speed of the automobile, the ambient temperature, and the speed at which the engine is operating. Fluid shear couplings used in connection with automobile engines are typically designed to have a drive member coupled to the engine and a driven member adapted to carry a fan for moving air over the radiator. The fluid shear coupling may be utilized to provide an appropriate rotation of the fan with respect to the conditions relevant to the required engine cooling.

Several factors are relevant to the construction and operation of fluid shear couplings. The degree of coupling between the drive member and the driven member depends upon many factors, including the proximity of the surfaces of the respective members which define the working chamber and the amount of working fluid contained within the working chamber. In the usual machining techniques for forming the coupling elements, the radial clearances between the coupling disc and housing may be achieved more closely than the axial clearances. Greater precision for radial clearances and more controlled coupling action is therefore generally more obtainable if the coupling uses primarily radial clearances to obtain the coupling action. The rate of movement of working fluid into and out of the working chamber, or in other words the rate of engagement and disengagement of the coupling action, is relevant to the accuracy with which a preselected temperature may be maintained. In effecting coupling of the coupling disc and housing, there is a substantial generation of heat within the working fluid and surrounding structures due to the considerable slippage of the two members and consequent friction. The rate of coupling and disengagement is also related to the generation of heat during these transitional phases of the fluid shear coupling. With this heat being generated, it is highly desirable to provide for dissipation of the heat to prevent working fluid and material degradation and fatigue. This heat dissipation is generally accomplished by convection from cooling fins located on the housing, and it is therefore advantageous to provide many such fins as close to the working surfaces as practical. Another consideration for fluid shear couplings is the size of the unit, especially the diameters of the rotatable coupling disc and housing, since these couplings frequently must fit in a confined area, and compactness also contributes to lower material costs. It is also desirable to avoid the build-up of deposits from the working fluid, which may be accomplished by circulating the working fluid during coupling of the housing and coupling disc.

In U.S. Pat. No. 3,559,785, issued to Weir on Feb. 2, 1971, there is disclosed a variable fluid coupling particularly adapted for use in connection with an internal combustion engine. The Weir coupling includes a coupling disc rotatably received within a housing. A first side of the coupling disc includes an annular cavity which operates as a storage chamber for the working fluid utilized in the coupling. This storage chamber communicates through an aperture to the second side of the coupling disc and a bimetallic strip is located on the second side to close the aperture in response to the ambient temperature. The coupling disc of the Weir device includes grooves on the sides and periphery of the coupling disc to cause a continuous flow of the working fluid around the coupling disc to the storage chamber. The Weir coupling is constructed to provide a more limited flow of the working fluid when the ambient temperature is reduced and the bimetallic strip consequently closes the aperture communicating with the storage chamber. This reduced flow of working fluid provides for a reduced coupling between the coupling disc and the housing and thus reduces the rotation of the fan during periods of cooler ambient temperatures. The Weir coupling is therefore temperature responsive and provides for varying rates of fan rotation depending upon the ambient temperature. The Weir coupling, however, does not provide for directly correlating the rate of fan rotation with the temperature within the engine block, which temperature is believed to be more relevant to the desired rate of rotation of the fan. Further, the coupling disc of the Weir coupling does not provide for a maximum efficiency in dissipating the heat generated within the working fluid during coupling of the drive member and the housing.

A temperature and speed sensitive drive coupling is disclosed in U.S. Pat. No. 3,059,745, issued to Tauschek on Oct. 23, 1962. The Tauschek coupling includes a rotatable clutch plate mounted coaxially within a housing. The flat periphery of the clutch plate is received within a narrow working chamber defined by the housing, and working fluid received within the working chamber operates to couple the clutch plate with the housing. The housing further defines an annular chamber disposed at the periphery of the clutch plate for reception of the working fluid. An expansible element is received within the annular chamber and is operable to expand and move fluid into the working chamber upon an increase in temperature. At the same time, the expansible element is responsive to the centrifugal force generated within the working fluid as the rotational rate of the housing increases. The expansible element may be selected in the Tauschek coupling to cause a reduction in the amount of working fluid received between the clutch plate and the housing, thereby reducing the degree of coupling between the two, when the rotational rate of the housing reaches a preselected upper limit. The Tauschek coupling is therefore both temperature and speed responsive. However, the Tauschek coupling does not directly correlate the rotation of the driven member to the temperature of the engine to which it is mounted, and further, because of the configuration of the clutch plate, does not provide for maximum efficiency in the dissipation of heat generated within the fluid. Fluid shear couplings having substantially the same construction are disclosed in U.S. Pat. Nos. 3,727,735 issued to La Flame on Apr. 17, 1973, and 3,088,566, issued to Flemming on May 7, 1963.

A temperature and/or speed sensitive fluid shear coupling is disclosed in U.S. Pat. No. 3,983,980, issued to Weintz on Oct. 5, 1976. The Weintz coupling includes a coupling disc having a wall extending from its periphery. The wall is sloped inwardly toward the center of the disc to provide, together with the disc, a working fluid reservoir. An aperture extends from this reservoir to the opposite side of the disc to provide fluid communication therebetween. A speed or temperature sensitive slot member is positioned to close the aperture in the disc and to thereby limit the flow of fluid from the reservoir through the aperture. The outer surface of the inwardly-sloped wall defines a groove for causing the working fluid to circulate around the wall and into the fluid reservoir. Although the Weintz coupling does provide for temperature-sensitive response, it does not correlate this response to the temperature within the engine. Moreover, the dissipation of heat from the drive fluid is impaired because the inwardly-sloped wall precludes the location of cooling fins in the full proximity of the working fluid.

Another prior art fluid shear coupling is disclosed in U.S. Pat. No. 3,170,552, issued to Mitchell on Feb. 23, 1965. The Mitchell coupling includes a coupling disc having an enlarged periphery which is somewhat conical in cross section. The surfaces of the enlarged periphery of the coupling disc define a working chamber with the housing within which the coupling disc is received. A fluid reservoir is positioned radially outward of the enlarged periphery of the coupling disc and is operable to move fluid into the working chamber. The fluid reservoir includes a diaphram which is spring-biased toward the center of the coupling disc, but which yields under a sufficient centrifugal force within the fluid to permit the fluid to move outwardly into the reservoir. Again, the Mitchell coupling is not responsive to a temperature within the engine. The Mitchell coupling does not provide a somewhat greater amount of working surfaces in the coupling disc for the given radial extent of the disc than had been provided in certain other prior art structures. However, the use of an enlarged periphery of the coupling disc again limits the efficiency of dissipating the heat from the working fluid.

In U.S. Pat. No. 3,323,623, issued to Roper on June 6, 1967, there is shown another construction for a fluid shear coupling. The Roper coupling includes a coupling disc which forms a working chamber with the housing within which it is received. The coupling disc of the Roper coupling includes several cylindrical flanges which extend from one side of the disc, giving the disc a comb-like appearance in cross section. The Roper coupling does provide the advantage of obtaining a relatively large amount of working surface for a given radial extent of the coupling disc. However, the dissipation of heat from the working fluid is limited due to the close proximity of the several flanges on the one side of the coupling disc.

As previously described, several factors are important in the construction and operation of fluid shear couplings. Circulation of the working fluid is advantageous to inhibit build-ups of deposits which would interfere with operation of the coupling, and to distribute generated heat to avoid fluid and material degradation. It is also desirable to provide an increased amount of working surface for a given radial extent of the coupling disc, while not sacrificing a quick rate of coupling and disengagement and an efficient rate of heat dissipation. While the various fluid shear couplings of the prior art are well suited to particular applications, a fluid shear coupling combining all of the above advantages has not previously existed.

SUMMARY OF THE INVENTION

A fluid shear coupling is disclosed herein which comprises a housing defining a reservoir chamber, a coupling disc received within the housing, the coupling disc including a disc-shaped body portion and a flange extending axially from the body portion, the flange having inside and outside working surfaces, the housing including working portions adjacent each of the working surfaces of the flange and defining therewith a working chamber, means for mounting the housing and the coupling disc to be rotatable about a common axis, pump means for moving a working fluid from the reservoir chamber to the working chamber, and several cooling fins located upon the exterior of the working portions of the housing, the fins extending radially inward of the inside working surface of the coupling disc and radially outward of the outside working surface of the coupling disc, each of the fins including portions positioned adjacent each of the working surfaces of said coupling disc.

It is an object of the present invention to provide a fluid shear coupling which is of simple and relatively inexpensive construction.

Another object of the present invention is to provide a fluid shear coupling which includes a relatively large area of working surfaces for a given diametric size.

It is a further object of the present invention to provide a fluid shear coupling which provides a highly efficient cooling of the working fluid.

A further object of the present invention is to provide a fluid shear coupling which includes the circulation of the working fluid to prevent the build-up of deposits in given areas of the coupling, to provide an even distribution of the heat generated within the working fluid to thereby reduce the possibility of fluid degradation or fatigue, and to provide a quick engagement and disengagement between the drive member and the driven member.

It is another object of the present invention to provide a fluid shear coupling which provides for variable coupling in response to a monitored temperature.

It is a further object of the present invention to provide a fluid shear coupling which is particularly adapted to use in conjunction with internal combustion engines used in automobiles.

Another object of the present invention is to provide a fluid shear coupling which, when used in conjunction with automotive engines, is adapted to increase the rotation of the engine cooling fan in response to a temperature monitored within a portion of the engine, permits operation of the fan at lower speeds to eliminate unnecessary and excessive fan noise, and prevents excessive engine loads and wear on driven elements.

It is a further object of the present invention to provide a fluid shear coupling which includes a well balanced driven member which also functions to move the working fluid into the working chamber to provide the coupling action.

It is another object of the present invention to provide a fluid shear coupling which is readily adapted to provide variable coupling in response to one or more monitored conditions.

A further object of the present invention is to provide a fluid shear coupling which includes a working fluid reservoir positioned radially outside of the working surfaces and from which the working fluid is quickly and directly movable to the working surfaces at the maximum radius of the coupling disc.

Further objects and advantages of the present invention will become apparent from the Description of the Preferred Embodiment which follows.

DESCRIPTION OF THE PREFERRED EMBODIMENT

Figure 1:
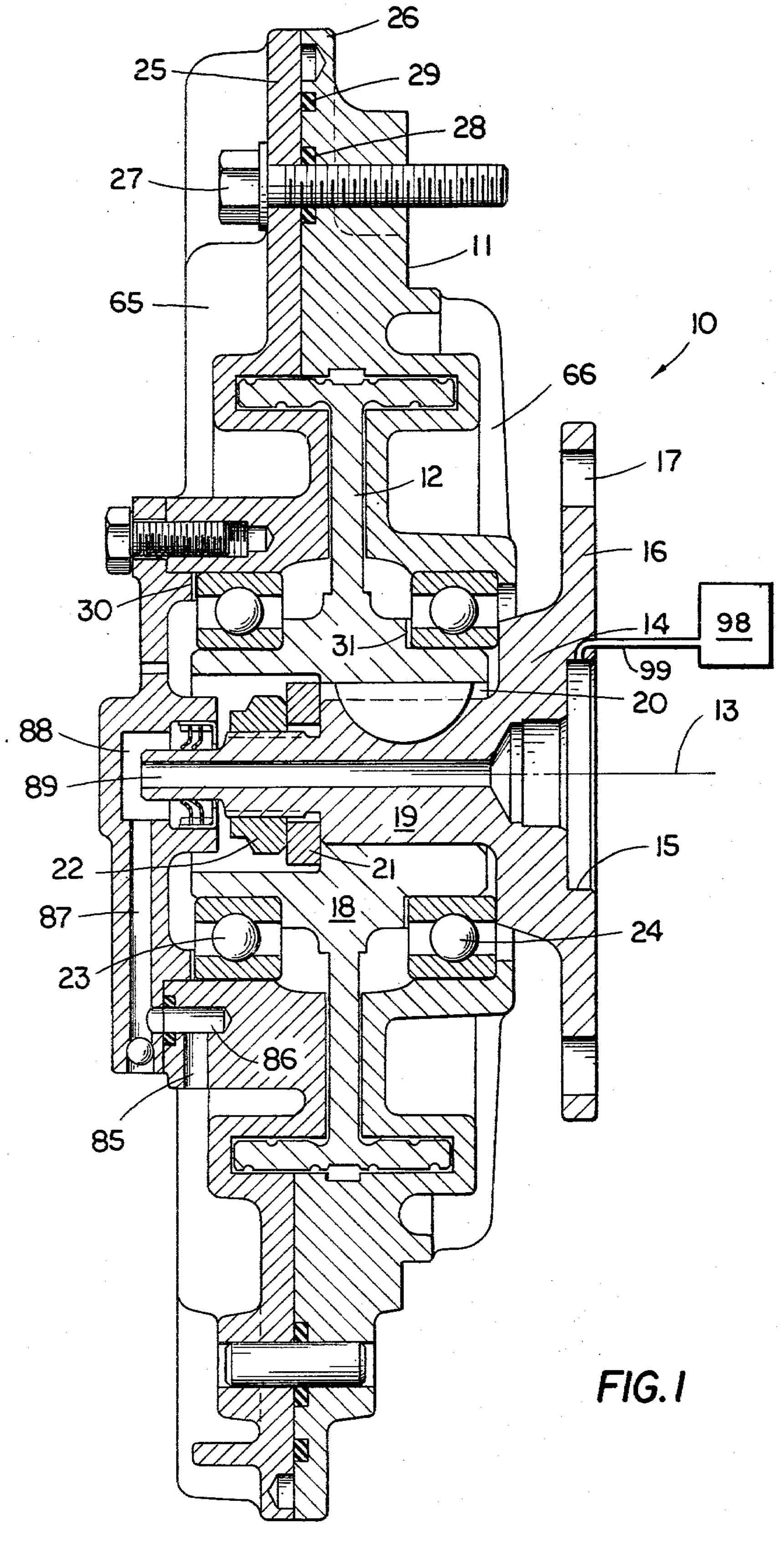
FIG. 1 is a cross-sectional view of a fluid shear coupling constructed in accordance with the present invention.
Figure 2:
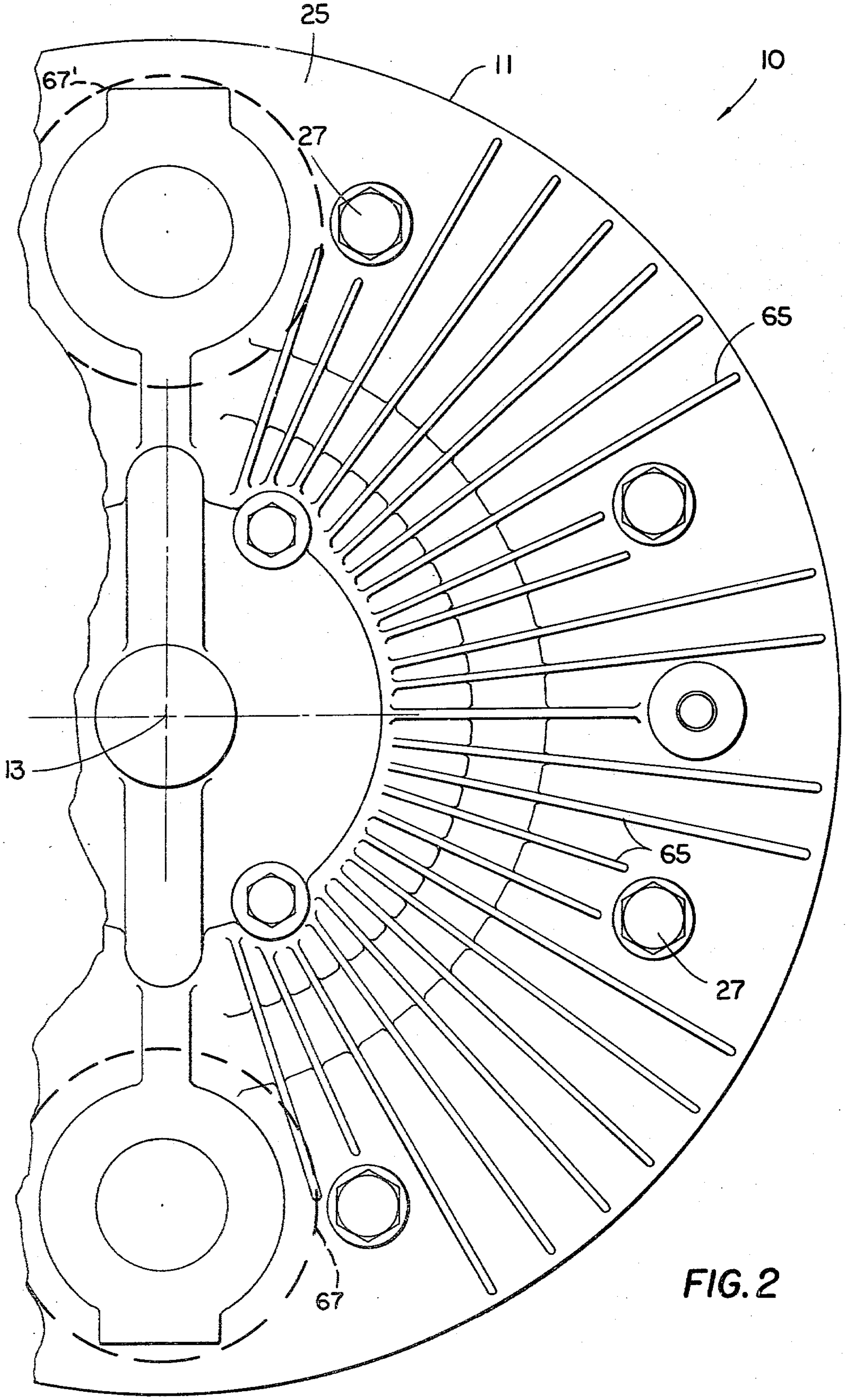
FIG. 2 is a front view of the housing of the fluid shear coupling of FIG. 1.

Referring in particular to FIGS. 1 and 2, there is shown a fluid shear coupling 10 constructed in accordance with the present invention. Coupling 10 includes a housing 11 and a coupling disc 12 received within the housing. Housing 11 and coupling disc 12 are mounted to rotate about a common axis 13, as will be more fully described below.

Fluid shear couplings in general include a drive member rotated by an external force and a driven member operable to be rotated by force applied by the drive member. This force is applied through the medium of a working fluid which is introduced into narrow spaces between the drive member and driven member and frictionally couples the two. The present invention includes a housing and coupling disc, either of which may be the drive member with the other then being the driven member. For purposes of illustration, a particularly preferred embodiment of the present invention will be described in which the coupling disc is the drive member and the housing is the driven member. It will be understood, however, that the roles of the coupling disc and the housing may be readily reversed by appropriate modification of the associated structure of the fluid shear coupling. It will also be understood that the fluid shear coupling of the present invention may have a variety of differing uses and applications. For convenience, the coupling of the present invention will be described in a particularly preferred embodiment useful in connection with automotive engines. Typically such engines may include a fluid shear coupling having the drive member coupled to an engine drive pulley assembly and having the engine fan mounted upon the driven member. The rotation of the engine fan is thereby dependent on and controllable by the regulated introduction of working fluid into the fluid shear coupling.

Fluid shear coupling 10 includes a drive pulley mount 14 upon which the coupling disc 12 is mounted. Mount 14 defines a cylindrical cavity 15 within which associated portions of a drive pulley assembly (not shown) are received in known fashion. Mount 14 further includes an annular flange 16 defining a plurality of apertures 17. Drive pulley mount 14 may thereby be mounted upon an engine drive pulley assembly with bolts received through the apertures 17 and secured to the drive pulley assembly of the engine in accordance with known techniques.

Coupling disc 12 is mounted upon the drive pulley mount 14, and both are rotatable about axis 13. Coupling disc 12 includes a cylindrical hub 18 which is received about a cylindrical body portion 19 of drive pulley mount 14. Hub 18 defines an axial slot 20 and body portion 19 defines a complementary key-way. Hub 18 of coupling disc 12 and body portion 19 of drive pulley mount 14 are secured against relative rotation by a Woodruff key received within slot 20 and within the key-way in body portion 19. Coupling disc 12 is further secured to drive pulley mount 14 by a nut 22 which is threadedly received upon body portion 19 and which retains a washer 21 against an annular shoulder defined by body portion 19.

Housing 11 includes housing members 25 and 26 which are rotatably mounted upon coupling disc 12. Bearing assemblies 23 and 24 include inner races received against cylindrical surfaces defined by hub 18 of coupling disc 12. Housing members 25 and 26 include cylindrical surfaces received against the outer races of bearing assemblies 23 and 24, respectively. Housing members 25 and 26 are secured together with bolts, such as 27. Seals, such as 28 and 29, are provided about the bolts, such as 27, and between the housing members adjacent their peripheries to prevent fluid leakage at these locations. Shims, such as 30 and 31, are provided to permit proper relative positioning of the bearing assemblies 23 and 24, coupling disc 12 and housing members 25 and 26.

Coupling disc 12 includes a disc-shaped body portion 32 (FIG. 3) having a central axis coinciding with axis 13. Cylindrical flanges 33 and 34 extend perpendicularly from the periphery of body portion 32. Flanges 33 and 34 define inside working surfaces 35 and 36 and outside working surfaces 37 and 38, respectively, with annular edge surfaces 62 and 63, which preferably are but need not be working surfaces, extending therebetween. Flanges 33 and 34 have respective radial dimensions 39 and 40 defined by the radial distance between the respective inside and outside working surfaces. Flanges 33 and 34 further have respective axial dimensions 41 and 42 defined by the axial distance between the edge surface and the nearest surface of body portion 32. The axial dimensions of the flanges 33 and 34 are preferably at least about 1.5 times the radial dimension of the respective flange. It is also preferable that the axial dimension of a flange be about 0.2 to about 2.0 times the radial dimension to the outside working surface of the flange if only one flange is present. With two flanges as shown, it is preferred that the total of the axial dimensions of the flanges be about 0.2 to about 2.0 times the average of the radial dimensions to the outside working surfaces of the flanges.

Flanges 33 and 34 of coupling disc 12 define helical grooves located in the inside and outside working surfaces. Alternatively, in an equivalent construction the grooves are defined by the interior surfaces of the working portions of the housing, but it is believed that this alternate embodiment is less desirable from a practical standpoint with respect to manufacturing costs. The grooves are provided to promote axial movement of a working fluid received against the inside and outside working surfaces as the coupling disc 12 is rotated about its central axis 13. The grooves are designed to cause the fluid to flow outwardly from the center 43 of body portion 32 along the outside working surfaces 37 and 38, and inwardly toward the center 43 of body 32 along the inside working surfaces 35 and 36. It will therefore be appreciated that the handedness of all of the helical grooves will not be the same. For example, the handedness of the groove defined by outside working surface 38 will be opposite that of the groove defined by outside working surface 37, and will also be opposite that of the groove defined by inside working surface 36. This may be readily understood since the intended axial direction of flow of the working fluid is the same, for example, for inside working surface 36 and outside working surface 37, and this direction is opposite the intended direction for movement of working fluid along inside working surface 35 and outside working surface 38.

Figure 3:
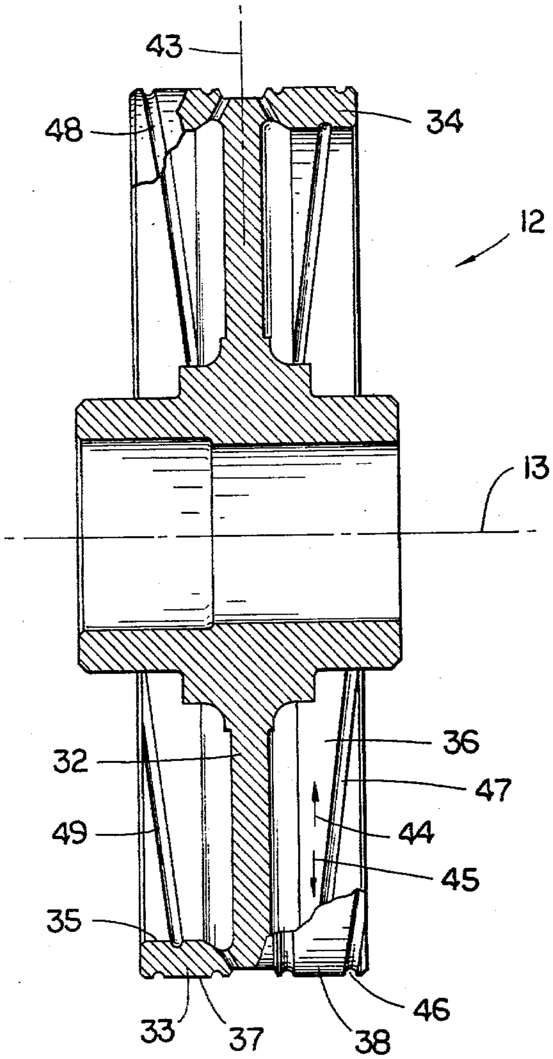
FIG. 3 is a partial, cross-sectional view of the coupling disc utilized in accordance with the present invention.

The appropriate handedness for the defined helical grooves is also dependent upon the intended direction of rotation of the coupling disc 12, as will be readily understood. For the purposes of the present discussion, the coupling disc 12 is constructed for rotation in a counterclockwise direction as viewed from the right in FIG. 3. Thus, the rear half of coupling disc 12 as substantially shown in FIG. 3 and upon which arrow 44 is located moves in the direction of arrow 44. Conversely, the front half of coupling disc 12, only a small portion of which is depicted in FIG. 3 will move in the direction of arrow 45. Due to this intended rotation of coupling disc 12, outside working surface 38 defines a left-handed helical groove 46 which upon the indicated rotation of coupling disc 12 causes a working fluid received against the groove to move outwardly from center 43 of body 32. In other words, working fluid will move along outside working surface 38 in the direction of the right in FIG. 3. Inside working surface 36 defines a right-handed helical groove 47 which upon rotation of coupling disc 12 in the indicated direction will cause a working fluid against the groove to move inwardly along inside working surface 36 or to the left in FIG. 3. Conversely, outside working surface 37 defines a right-handed helical groove 48 which will cause a working fluid to move outwardly and to the left in FIG. 3, and inside working surface 35 includes a left-handed helical groove 49 to move a working fluid inwardly or to the right in FIG. 3.

Figure 4:
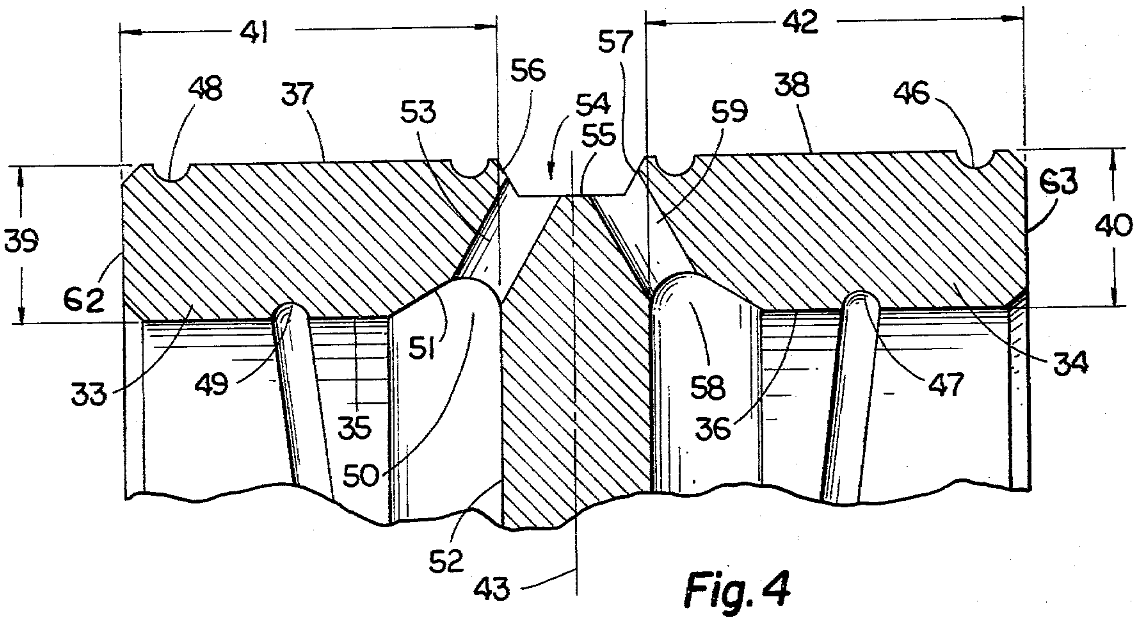
FIG. 4 is a cross-sectional view of the outer portion of the coupling disc of FIG. 3.

Referring in particular to FIG. 4, it is shown that coupling disc 12 defines apertures communicating between the respective inside and outside working surfaces of flanges 33 and 34. Coupling disc 12 preferably defines several of these apertures radially spaced about the respective flanges. The details of the apertures and associated structure are mirror images for flanges 33 and 34, and therefore only the structure associated with an aperture defined by flange 33 will be described for convenience. Flange 33 defines an annular channel 50 with which helical groove 49 communicates. Channel 50 is positioned adjacent body portion 32 of coupling disc 12 and includes a frustoconical surface 51 disposed at an angle to outside surface 52 of body portion 32 of preferably about 60°. Coupling disc 12 defines a cylindrical aperture 53 which is preferably disposed radially of coupling disc 12 and at an angle of about 30° to outside surface 52 of body portion 32.

Coupling disc 12 defines an annular channel 54 having a bottom surface 55 recessed radially of outside working surfaces 37 and 38. Channel 54 preferably includes frustoconical side surfaces 56 and 57 which are preferably disposed at an angle of about 120° to bottom surface 55. Aperture 53 communicates with channels 50 and 54 and provides for fluid flow between these channels. Working fluid moving inwardly along inside working surface 35 is free to move within annular channel 50 to the apertures, such as 53, and to subsequently move through the apertures by centrifugal force to channel 54. Working fluid is similarly movable inwardly along inside working surface 36 to annular channel 58, to and through apertures such as 59 and finally to channel 54.

Figure 5:
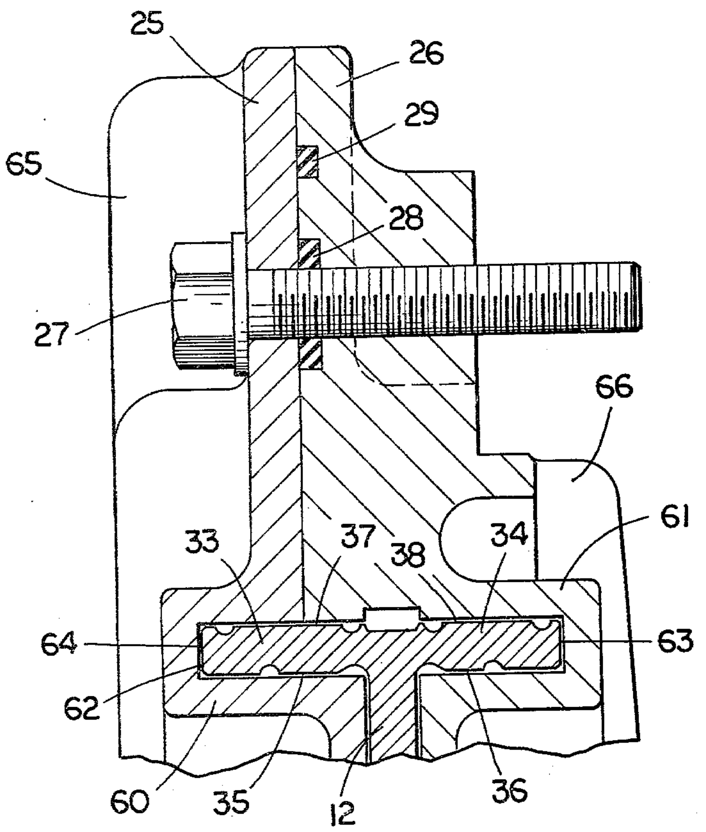
FIG. 5 is a partial, cross-sectional view of a portion of the fluid shear coupling shown in FIG. 1, particularly showing the details of the attachment of the two housing members.

Referring now in particular to FIGS. 1 and 5, it is shown that the housing members 25 and 26 include working portions 60 and 61, respectively, which have interior surfaces proximate to the working surfaces of flanges 33 and 34. Coupling disc 12 includes inside working surfaces 35 and 36 and outside working surfaces 37 and 38, and further includes edge surfaces 62 and 63, which may be working surfaces. Working portions 60 and 61 of housing members 25 and 26, respectively, include surfaces which are spaced apart from but closely adjacent to the working surfaces of coupling disc 12. As is well known in the art, the close proximity of these surfaces defines a working chamber 64 which surrounds the flanges 33 and 34 and within which a working fluid may be received. A working fluid received within working chamber 34 will provide for a force transmission between the coupling disc 12 and housing 11 as is known in the art. The working fluid may be selected from any of the number of fluids known to be useful for this purpose.

In a first condition (FIG. 6) of the fluid shear coupling 10, the coupling disc 12 is rotating from the connection through drive pulley mount 14 with the engine drive pulley assembly. Without the presence of working fluid in working chamber 64, the housing 11 remains motionless. As working fluid is introduced into working chamber 64, the angular momentum of the coupling disc 12 is inparted to the housing 11 through the medium of the working fluid, and a corresponding rotation of the housing 11 results. A considerable amount of heat is generated within the working fluid while it is within the working chamber 64 due to the relative rotation of housing 11 and coupling disc 12. Housing members 25 and 26 are therefore provided with numerous radially-extending cooling fins, such as 65 and 66, to facilitate the dissipation of the generated heat. Working portions 60 and 61 of housing members 25 and 26, respectively, are preferably of a generally constant and small cross section to maximize the efficiency of the cooling fins.

As is apparent from the drawings, the construction of the present invention provides for the location of fins having portions upon each part of the working portions 60 and 61 and therefore adjacent each of the working surfaces of flanges 33 and 34. The present construction moreover provides for the placement of cooling fins proximate to a proportion of the working surfaces of coupling disc 12, and thereby enhances the efficiency of the cooling structure.

Heat is dissipated through the housing and the fins and transferred to the surrounding air. The fins greatly enhance the heat transfer, particularly in the regions in which the fins are exposed to moving air and substantial convection occurs. In this regard, a fluid shear coupling, as employed in most applications, is mounted close to a supporting object such as an automobile engine. For example, the present preferred embodiment is being described in a particular application in which the fluid shear coupling includes a drive pulley mount 14 securable to an engine drive pulley assembly. It will be appreciated that the cooling efficiency of the coupling, and the cooling fins in particular, will vary for the various locations on the coupling. The cooling fins 65 will have a greater efficiency by being away from the engine than the cooling fins 66, with the portions of fins 66 located radially-inward of the working surfaces displaying the least cooling efficiency. The latter mentioned portions of the cooling fins are therefore of less importance and may not be desired in certain applications.

Housing 11 defines at least one, and preferably two or three, working fluid reservoirs located radially outward of coupling disc 12. If two or more reservoirs are utilized, it is preferable that the reservoirs be equally spaced about the central axis 13 of housing 11 to properly balance the housing for rotation. The inclusion of two or more reservoirs is particularly advantageous for providing the coupling to be responsive to more than one monitored condition. For example, one reservoir could be adapted for moving working fluid into the working chamber in response to the temperature in the radiator with a second reservoir operating similarly but in response to a different monitored condition such as the engine oil temperature. Moreover, the various reservoirs could be advantageously utilized even when monitoring only a single condition, with each reservoir being responsive to a different, though perhaps overlapping, range of the monitored condition. Thus, a first reservoir could be responsive to a first temperature range in the engine coolant, with other reservoirs providing additional working fluid, and therefore more coupling action, when the engine coolant advances to higher temperature ranges.

Figure 6:
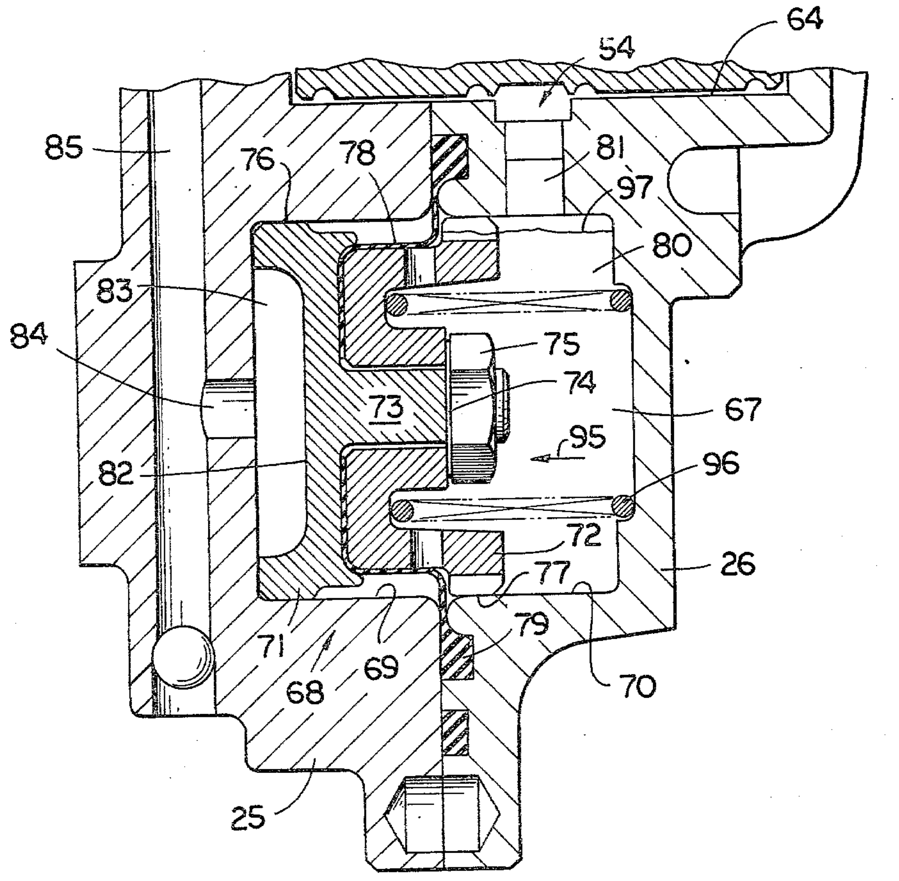
FIG. 6 is a partial, cross-sectional view of a portion of the fluid shear coupling of FIG. 1, particularly showing the construction of the working fluid reservoir and associated pumping mechanism.
Figure 7:
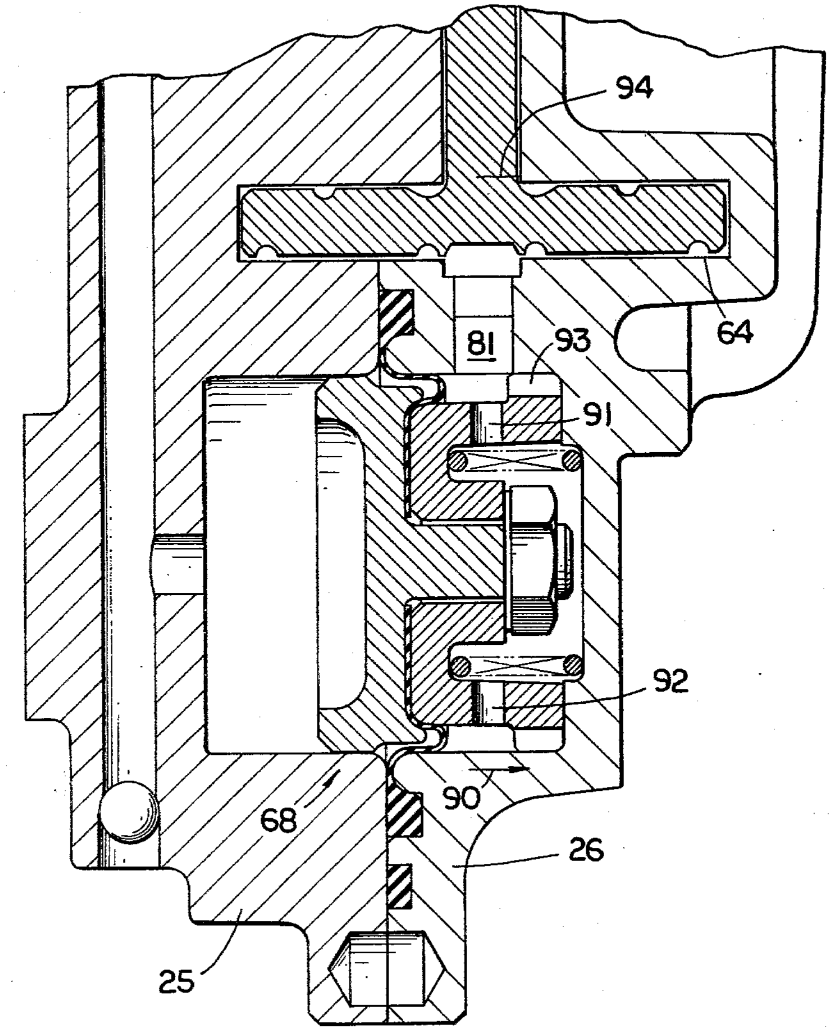
FIG. 7 is a view of the portion of the fluid shear coupling shown in FIG. 6, with the piston assembly shown in its furthest position from that shown in FIG. 6.

Referring in particular to FIGS. 6 and 7, there is shown a reservoir 67 and a pumping mechanism 68 associated therewith. Additional reservoirs, such as the second reservoir 67' (FIG. 2), are preferably balanced with and configured identically with the first reservoir 67, and therefore only the reservoir 67 will be described in detail herein. Housing members 25 and 26 define complementary cylindrical cavities 69 and 70, respectively, within which a piston assembly is received. The piston assembly comprises a first piston member 71 and a second piston member 72. Piston member 71 includes a central post 73 and second piston member 72 includes a central aperture within which the post 73 is received. Second piston member 72 is secured upon first piston member 71 by a washer 74 and nut 75 which is threadedly received upon post 73. The piston assembly comprising piston members 71 and 72 is constructed for reciprocation within cavities 69 and 70 between the positions shown in FIGS. 6 and 7. First piston member 71 therefore includes a cylindrical outer surface 76 which is designed to ride against the wall defining cylindrical cavity 69. Similarly, second piston member 72 includes a cylindrical outer surface 77 designed to ride against the wall defining cylindrical cavity 70.

A flexible gasket 78 is sealingly received between piston members 71 and 72. Gasket 78 includes an outer circular lip 79 received between housing members 25 and 26 and sealing those members at that location. A working fluid 80 is received within reservoir 67 and is partially sealed therein by the gasket 78. Reservoir 67 communicates with working chamber 64 through passageway 81. Working fluid 80 is thereby movable from reservoir 67 to and through passageway 81 and finally to working chamber 64. Passageway 81 is radially aligned with working chamber 64 and more specifically with the apertures, such as 53 and 59, to provide a quick and efficient dumping of the working fluid from the working chamber.

The movement of working fluid 80 is controlled by pumping mechanism 68 and more specifically by the piston assembly which forms a part thereof. The action of the pumping mechanism 68 may be triggered in a variety of fashions, which may depend, for example, on the particular application in which the fluid shear coupling is being used. The pumping mechanism may be controlled to be responsive to changes in various preselected parameters, such as the rotational rate of the housing, the speed of an engine to which the coupling is mounted or the temperature at a given location such as in the engine block or coolant. As previously noted, the fluid shear coupling of the present invention is being described in a particularly preferred application in connection with automotive engines. In this application it is most preferable to provide the pumping mechanism 68 to be responsive to a temperature in the engine. Typically, the temperature in the cylinder block or in the engine coolant would be selected for controlling the operation of pumping mechanism 68. Also as previously described, the introduction of working fluid into the working chamber, and therefore the coupling action, could be readily made responsive to more than one monitored condition, particularly by the inclusion of more than one reservoir with each responsive to a separate condition.

In the preferred embodiment shown in the drawings, the pumping mechanism 68 is dependent upon the application of pressure against the cup shaped surface 82 of first piston member 71. The chamber 83 partially defined by surface 82 of first piston member 71 communicates through passageways 84–88 (FIGS. 1 and 6) with the hollow core 89 of drive pulley mount 14. A suitable temperature-sensitive control is appropriately located in the engine at a position to be responsive to the particular engine temperature selected for controlling the operation of pumping mechanism 68. Temperature-sensitive controls of this type are well known in the art and will therefore not be described in detail herein. The controls 98, shown schematically in FIG. 1, for example, may have a fluid outlet 99 sealingly connected with the hollow core 89 of drive pulley mount 14. A fluid, which may either be a liquid or a gas, is contained within chamber 83, passageways 84–88, hollow core 89 and the connection with the fluid outlet of the control. The temperature-sensitive control is operable, upon a variation in the monitored temperature, to apply a force against the fluid contained in the various passageways and chambers. This force is transmitted through the medium of the fluid to surface 82 to first piston member 71. Thus, a change in the temperature being monitored by the control results in a change in the force being applied upon surface 82 of first piston member 71. Typically, an increase in the monitored temperature would result in an increased force against first piston member 71.

With a sufficient increase in temperature, the force applied against surface 82 of first piston member 71 causes the piston members 71 and 72 to move within cylindrical cavities 69 and 70 in the direction 90. As the piston members move within the cylindrical cavities, the working fluid 80 is moved through passageway 81 to annular channel 54. Second piston member 72 includes radial apertures, such as 91 and 92, and an axial slot 93 to permit the working fluid 80 to move around the second piston member to passageway 81. As the working fluid is moved through passageway 81, it is free to move within annular channel 54 about the full periphery of coupling disc 12. Coupling disc 12 is driven in rotation by its connection with the engine drive pulley assembly, and this rotation of coupling disc 12 facilitates the annular distribution of the working fluid within channel 54.

The presence of the grooves in the outside working surfaces together with the pressure within the working fluid due to the force applied through the first and second piston members cause the working fluid 80 to move outwardly along the outside working surfaces. As previously described, the presence of the grooves and the rotation of the coupling disc greatly facilitate the outward movement of the working fluid 80. As the working fluid moves within the working chamber 64, the degree of coupling between the rotating coupling disc 12 and the once-idle housing 11 increases and the housing 11 is caused to rotate, although at a speed less than the speed of rotation of coupling disc 12.

Application of sufficient pressure against surface 82 of first piston member 71 results in movement of the piston members to their fullest extent in the direction 90, and results in a fluid level 94 about coupling disc 12. As the first and second piston members 71 and 72, respectively, are moved in the direction 90 to their full extent, the working fluid 80 is moved outwardly along the outside working surfaces and eventually is moved inwardly along the inside working surfaces to channels 50 and 58, until the fluid level 94 is achieved. As is well known, the degree of coupling of housing 11 with coupling disc 12 increases in direct relationship to the volume of working chamber 64 filled with the working fluid 80.

As the working fluid is moved inwardly along the inside working surfaces, it is eventually moved into the channels 50 and 58 defined by coupling disc 12. As previously described, coupling disc 12 further defines a plurality of radially-disposed apertures communicating between the channels 50 and 58 and the annular channel 54. Channels 50 and 58 permit the working fluid 80 to move to the radially-disposed apertures and through these apertures by centrifugal force to channel 54. In this manner, the working fluid is caused to circulate outwardly along the outside working surfaces, inwardly along the inside working surfaces and radially through the apertures communicating between channels 50 and 58 and channel 54. This circulation of the working fluid 80 is advantageous in at least three respects. First, the fluid movement provides for a more even distribution of the heat generated within the working fluid due to the relative rotation of coupling disc 12 and housing 11. This even distribution of the generated heat provides for a greater efficiency in the cooling fins and decreases chemical degradation of the fluid due to localized "hot spots." Second, the continuous circulation inhibits the build-up of deposits on the coupling disc or housing, which deposits would reduce the efficiency of the coupling action of the fluid. Third, the fluid circulation provides for a quicker and more complete discharge of the working fluid upon movement of the fluid from working chamber 64 to fluid reservoir 67, as will be more fully described below.

Upon a reduction of the monitored temperature in the engine, the temperature-sensitive control will reduce the pressure exerted upon surface 82 of first piston member 71. A compression coil spring 96 is located within fluid reservoir 67 and bears against housing member 26 and second piston member 72. As the pressure against surface 82 of the first piston member 71 is reduced, coil spring 96 moves the piston members 71 and 72 in the direction 95 (FIG. 6). As this occurs, the fluid within passageway 81 and annular channel 54 is free to move into fluid reservoir 67. Further, the working fluid contained within working chamber 64 is continued to be moved in the circulation pattern previously described and eventually enters channel 54. Due to the continued rotation of coupling disc 12, and also due to the centrifugal force thereby generated within the working fluid, the working fluid is removed through channel 54 to passageway 81, and eventually into fluid reservoir 67. An amount of working fluid 80 is charged to the fluid shear coupling to result in a fluid level 97 within reservoir 67 upon full movement of the piston members in the direction 95.

As a particular example of the operation of the fluid shear coupling of the present invention, it will be understood that pumping mechanism 68 is moved to its full extent in the direction 95 when the coupling is not occurring, or in other words when the monitored temperature is sufficiently low that coupling is not dictated. The working fluid 80 remains in the reservoir 67 due to the centrifugal force exerted against it if it attempts to move into channel 54. As previously noted, more than one fluid reservoir, such as 67, may be utilized, in which case the plurality of reservoirs should be spaced equally about the housing 11 to provide balance for rotation. It is particularly desirable that two fluid reservoirs be utilized to provide balance for the housing 11, and also to permit convenient spacing of the reservoirs considering the fact that the connection of the housing members and of the fan to the housing are both generally accomplished by equally spaced bolts.

In a particular embodiment, the temperature-sensitive control located for monitoring and responding to a given temperature in the engine comprises a heat pellet located in the appropriate engine location. As the temperature around the heat pellet increases, the pellet expands and force is applied against first piston member 71 through the medium of the fluid surrounding the heat pellet and communicating through the various passageways to chamber 83. Movement of the first and second piston members 71 and 72, respectively, in the direction 90 (FIG. 7) begins to force the working fluid 80 radially inward through passageway 81 and annular channel 54 to the working chamber 64. As the engine temperature continues to increase, more and more working fluid is displaced from the reservoir 67 into the working chamber 64, thus causing the housing 11 and fan mounted thereon to be driven faster and faster. The increasing engine temperature will therefore result in a corresponding increase in the fan rotation to provide increased cooling of the engine coolant and therefore of the engine. Either a single heat pellet or several pellets may be utilized in this fashion. Alternatively, one or more pellets could be placed directly in the reservoir in place of the previously-described pumping mechanism. The pellets would then directly force working fluid into the working chamber upon expansion due to increased temperature in the area of the housing.

When cooling takes place, the heat pellet contracts and allows the piston members 71 and 72 to move in the direction 95. The piston members are urged in the direction 95 by coil spring 96 and further by the centrifugal head of the working fluid. As the piston members return to their initial position (FIG. 6), the working fluid is evacuated from the working chamber 64 by centrifugal force and by the pumping action of the grooves defined by the flanges of the coupling disc.

As previously noted, several problems may exist in the performance of the fluid shear couplings of the prior art. Certain of the prior art devices have displayed inconsistent and erratic performance, cycling, wide hysteresis of disengagement and erratic pumping flow of the working fluid. Disadvantages also noted in prior art devices include high minimum or disconnect speeds, difficulty of dimensional tolerance control of the working clearances and inadequate control over the rotational speeds at which filling and dumping of the working fluid occur. Another problem has been the lack of suitable exposure of the outside surfaces of the working chamber to the cooling air. With respect to the responsiveness of the couplings of the prior art, problems have existed in the location of the heat sensing element, particularly where the responsiveness is limited to ambient temperatures. Further, those prior art fluid shear couplings which locate the working fluid reservoir interior of the periphery of the coupling disc have been susceptible to high heat in these areas due to the inability to provide sufficient heat dissipation in these locations.

The present invention provides a fluid shear coupling which combines the various advantages of the prior art devices while limiting or eliminating the disadvantages previously associated with fluid shear couplings. The use of the flanges extending perpendicularly from the periphery of the coupling disc permit good control of working clearances and also provides increased amounts of working surfaces for a given radial extent of the coupling. The use of the grooves in the inside and outside working surfaces and the apertures communicating between the inside and outside working surfaces directly above the passageway 81 to the fluid reservoir provide for minimization of build-ups of deposits, good distribution of generated heat through the working fluid to minimize degradation, and a rapid rate of engagement and disengagement by the quick filling and dumping of the working chamber. The use of the perpendicularly-extending flanges and the location of the fluid reservoir radially outward of the coupling disc permit the location of cooling fins for maximum cooling efficiency. As further disclosed herein, the pumping mechanism 68 may be responsive to a monitored engine temperature, for example, and is not limited to responsiveness through ambient temperatures.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A fluid shear coupling which comrpises:

a housing defining a reservoir chamber;

a coupling disc received within said housing, said coupling disc including a disc-shaped body portion and a first flange extending axially from the body portion, the first flange having inside and outside working surfaces, said housing including working portions adjacent each of the working surfaces of the first flange and defining therewith a working chamber, the inside and outside working surfaces of said first flange defining helical grooves, said coupling disc further defining a plurality of apertures adjacent the body portion and communicating between the inside and outside working surfaces of the first flange;

means for mounting said housing and said coupling disc to be rotatable about a common axis; and pump means for moving a working fluid from the reservoir chamber to the working chamber.

2. The apparatus of claim 1 in which the axial dimension of said flange is about 0.2 to about 2.0 times the radial dimension to the outside working surface of said flange.

3. The apparatus of claim 1 in which the reservoir chamber defined by said housing is located radially outward of said coupling disc, said housing defining a passageway communicating between the reservoir chamber and the working chamber, the passageway being radially aligned with the plurality of apertures defined by said coupling disc.

4. The apparatus of claim 1 in which the inside and outside working surfaces of said coupling disc are cylindrical and extend perpendicularly from the body portion of said coupling disc.

5. The apparatus of claim 1 in which said coupling disc includes a second flange extending axially from the body portion of said coupling disc in a direction opposite the axial extension of the first flange, the second flange having inside and outside working surfaces and said housing including second working portions adjacent each of the working surfaces of the second flange, the working chamber being further defined by the space between the working surfaces of the second flange and the second working portions of said housing, the inside and outside working surfaces of said second flange defining helical grooves, said coupling disc defining a plurality of apertures adjacent the body portion and communicating between the inside and outside working surfaces of the second flange.

6. The apparatus of claim 5 in which the total of the axial dimensions of said first and second flanges is about 0.2 to about 2.0 times the average of the radial dimensions to the outside working surfaces of said flanges.

7. The apparatus of claim 5 in which the reservoir chamber defined by said housing is located radially outward of said coupling disc, said housing defining a passageway communicating between the reservoir chamber and the working chamber, the passageway being radially aligned with the plurality of apertures defined by said coupling disc.

8. A fluid shear coupling which comprises:

a housing defining a reservoir chamber;

a coupling disc received within said housing, said coupling disc including a disc-shaped body portion, said coupling disc including first and second flanges extending in opposite axial directions from the periphery of the body portion, each of the flanges having inside and outside working surfaces, said housing including working portions adjacent each of the working surfaces of each of the first and second flanges and defining therewith a working chamber, the inside and outside working surfaces being cylindrical and extending perpendicularly from the body portion of said coupling disc, each of the inside and outside working surfaces defining a helical groove, said coupling disc defining a plurality of apertures adjacent the body portion and communicating between the inside and outside working surfaces of the first flange and a plurality of apertures adjacent the body portion and communicating between the inside and outside working surfaces of the second flange;

means for mounting said housing and said coupling disc to be rotatable about a common axis; and pump means for moving a working fluid from the reservoir chamber to the working chamber.

9. The apparatus of claim 8 in which the axial dimension of each of the flanges is at least about 1.5 times the radial distance between the inside and outside working surfaces.

10. The apparatus of claim 9 in which the reservoir chamber is positioned radially outward of said coupling disc, said housing defining a passageway communicating between the reservoir chamber and the working chamber, the passageway being radially aligned with the plurality of apertures defined by said coupling device.

11. The apparatus of claim 8 in which the total of the axial dimensions of said first and second flanges is about 0.2 to about 2.0 times the average of the radial dimensions to the outside working surfaces of said flanges.

12. The apparatus of claim 11 in which the working portions of said housing are of generally-constant thickness.

13. The apparatus of claim 12 in which said pump means includes a pumping mechanism associated with the reservoir chamber, said pump means further including means for monitoring a preselected parameter and actuating the pumping mechanism in response to changes in the preselected parameter.

14. A fluid shear coupling which comprises:

a housing defining a reservoir chamber;

a coupling disc received within said housing, said coupling disc including a disc-shaped body portion and a flange extending axially from the body portion, the flange having inside and outside working surfaces, the inside and outside working surfaces of said coupling disk defining helical grooves, said coupling disc defining a plurality of apertures adjacent the body portion of said coupling disc and communicating between the inside and outside working surfaces, said housing including working portions adjacent each of the working surfaces of the flange and defining therewith a working chamber;

means for mounting said housing and said coupling disc to be rotatable about a common axis;

pump means for moving a working fluid from the reservoir chamber to the working chamber; and several cooling fins located upon the exterior of the working portions of said housing, said fins extending radially inward of the inside working surface of said coupling disc and radially outward of the outside working surface of said coupling disc, each of said fins including portions positioned adjacent each of the working surfaces of said coupling disc.

15. The apparatus of claim 14 in which the inside and outside working surfaces of said coupling disc are cylindrical and extend perpendicularly from the body portion of said coupling disc.

16. The apparatus of claim 15 in which the axial dimension of the flange is at least about 1.5 times the radial distance between the inside and outside working surfaces.

17. A fluid shear coupling which comprises:

a housing defining a reservoir chamber;

a coupling disc received within said housing, said coupling disc including a disc-shaped body portion and a first flange extending axially from the body portion, the first flange having inside and outside working surfaces, said housing including first working portions adjacent each of the working surfaces of the first flange and defining therewith a working chamber, said coupling disc including a second flange extending axially from the body portion of said coupling disc in a direction opposite the axial extension of the first flange, the second flange having inside and outside working surfaces and said housing including second working portions adjacent each of the working surfaces of the second flange, the working chamber being further defined by the space between the working surfaces of the second flange and the second working portions of said housing;

means for mounting said housing and said coupling disc to be rotatable about the common axis;

pump means for moving a working fluid from the reservoir chamber to the working chamber; and several cooling fins located upon the exterior of the first and second working portions of said housing, said fins extending radially inward of the inside working surfaces of the first and second flanges of said coupling disc and further extending radially outward of the outside working surfaces of the first and second flanges of said coupling disc, each of said fins including portions positioned adjacent each of the working surfaces of the first and second flanges of said coupling disc.

18. The apparatus of claim 17 in which each of the inside and outside working surfaces of said coupling disc define helical grooves, and further in which said coupling disc defines a plurality of apertures adjacent the body portion of said coupling disc and communicating between the inside and outside working surfaces of the first flange and communicating between the inside and outside working surfaces of the second flange.

19. The apparatus of claim 18 in which the axial dimension of each of the flanges is at least about 1.5 times the radial distance between the inside and outside working surfaces.

20. The apparatus of claim 19 in which the working portions of said housing are of generally-constant thickness.

21. The apparatus of claim 17 in which the reservoir chamber is positioned radially outward of said coupling disc, said housing defining a passageway communicating between the reservoir chamber and the working chamber, the passageway being radially aligned with the plurality of apertures defined by said coupling disc.

22. The apparatus of claim 21 in which said housing defines a second reservoir chamber diametrically opposed from the first reservoir chamber, said pump means being for moving a working fluid from each of the reservoir chambers to the working chamber, said housing defining a second passageway communicating between the second reservoir chamber and the working chamber, the second passageway being radially aligned with the plurality of apertures defined by said coupling disc.

23. The apparatus of claim 17 in which said pump means includes a pumping mechanism associated with the reservoir chamber, said pump means further including means for monitoring a preselected parameter and actuating the pumping mechanism in response to changes in the preselected parameter.

24. The apparatus of claim 23 in which the preselected parameter is the temperature in a given location.

* * * * *